UNITED STATES PATENT OFFICE.

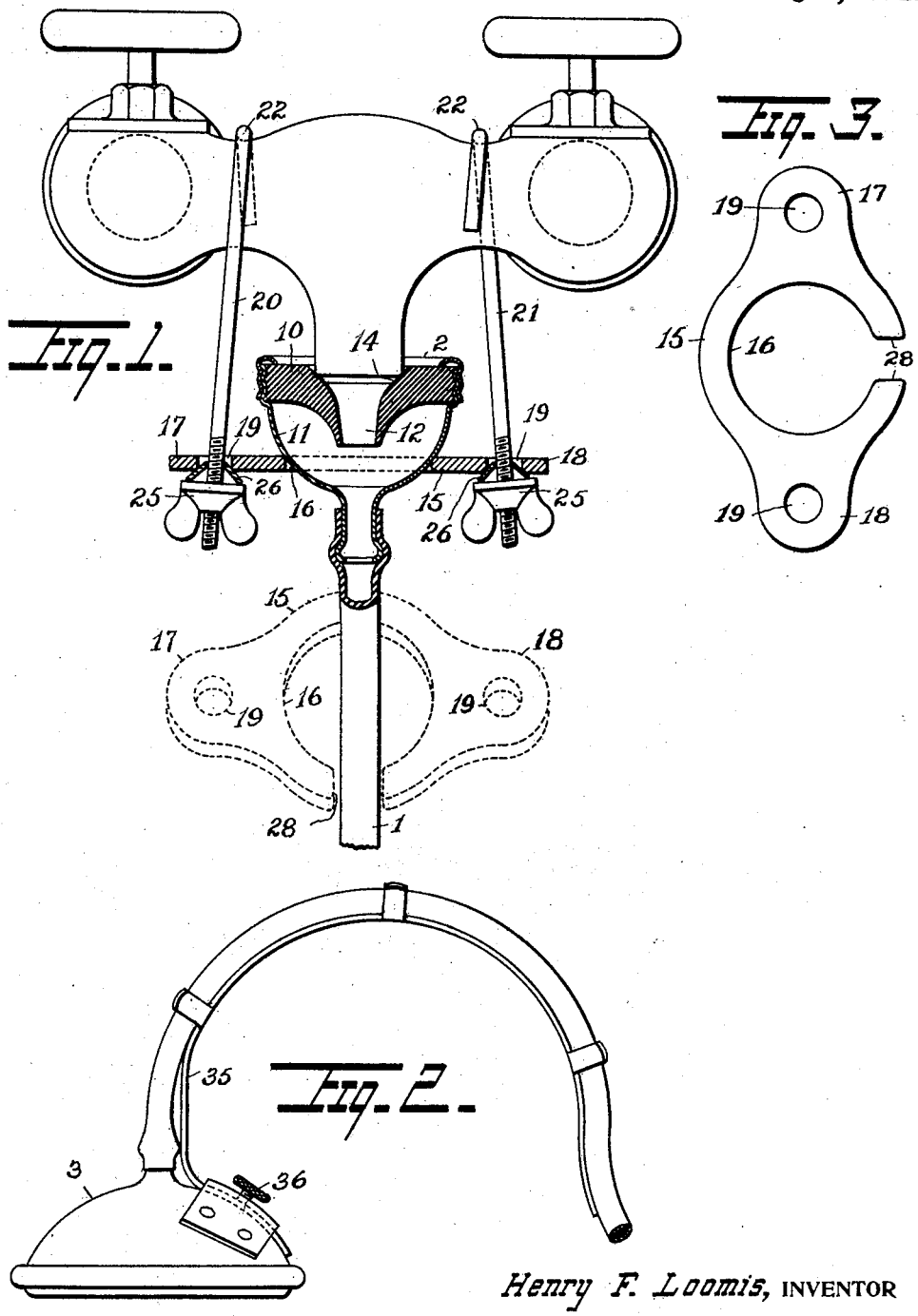

HENRY F. LOOMIS, OF READING, PENNSYLVANIA.

BATH-SPRAY.

1,386,518.  Specification of Letters Patent.  Patented Aug. 2, 1921.

Application filed February 11, 1920. Serial No. 357,855.

*To all whom it may concern:*

Be it known that I, HENRY F. LOOMIS, a citizen of the United States, residing at Reading, in the county of Berks and State of Pennsylvania, have invented certain new and useful Improvements in Bath-Sprays, of which the following is a specification.

My invention relates to bath sprays and particularly for attaching the same to a faucet and supporting the spray nozzle end on the body of the user when desired, as more fully described in connection with the accompanying drawing and the novel features of which are pointed out in the subjoined claim.

Figure 1 is a sectional elevation showing my improved spray attachment in connection with a usual form of mixing faucet.

Fig. 2 is a view of the spray nozzle end of the hose with my improved shoulder rest extension attached thereto.

Fig. 3 is a separate view of the clamping plate.

Bath sprays commonly in use comprise a hose with a spray nozzle at one end and a cupped head at the other end adapted to be frictionally engaged to the faucet by forcing the same over the reduced outlet end of the latter. This frictional engagement in a short time becomes unsatisfactory and the pressure of the water causes leaks and unintentional disconnection. One of my objects is to overcome these defects and also to adapt the spray for use with faucets that are not provided with reduced outlet ends over which the cupped head may be forced.

In the drawings 1 represents the hose of the usual bath spray, 2 the cupped head thereof and 3 the spray nozzle end. This cupped head 2 is commonly formed entirely of soft rubber or with a soft rubber washer 10 retained in a metal cup 11 and having a central opening 12 through which the outlet end of the faucet is forcibly pressed. In the drawings I have indicated this old form of washer 10, but I preferably provide the opening 12 with a countersunk conical seat 14, and have shown the application of this cupped head to a faucet not provided with an outlet end of reduced size. As shown the seat 14 bears against the end of the faucet, the conical walls readily centering the head, and to retain and press this washer 10 against the faucet and maintain a water tight seat against the latter, I provide a clamping plate 15 having an opening 16 adapted to embrace the cupped head 2; said plate having ear extensions 17 and 18 provided with bolt openings 19 for engagement of the clamping hook bolts 20 and 21. These bolts have hooked ends 22 adapted to engage the faucet as shown and their screw threaded lower ends 23 have considerable play in the openings 19 so that the bolts may be inclined at any angle required to properly engage the faucet. Thumb nuts 25 beneath the ears 17 and 18 permit drawing up on the clamping hooks until the cupped head washer 10 is securely seated against the faucet outlet. To insure proper seating of the nuts 25, when the bolts are angularly inclined, I preferably provide dished washers 26 as shown adjustably seating in the openings 19. And to facilitate the application of my clamping means to any spray, I preferably provide the plate opening 16 with a side outlet 28 of reduced size but sufficient for passage of the hose portion 1 of the spray, so that the plate may be readily strung upon the hose (as indicated in dotted lines Fig. 1) and moved along the latter to its seat against the cupped head 2.

In use the hose 1 near the spray nozzle 3, is subject to sharp bends, reducing the flow of water and causing strains due to the restricted passage; and to overcome this and at the same time provide means for supporting the hose upon the shoulder of the user, freeing both hands for other uses, I employ the shoulder rest extension 35 shown in the drawings. This extension consists of a curved metal plate secured to the nozzle 3 as an integral part thereof, or preferably held thereto by the set screw 36 as indicated. This extension is adapted to rest upon the user's shoulder to support and hold the nozzle 3 in a downwardly directed position, and the hose 1 may be secured thereto in any desired manner preferably detachably as indicated, so as to be supported around the curve and preventing any sharp bend that would cause a reduced flow of water.

My improvements are simple and are effective in improving the usefulness and life of the spray and may be readily manufactured as integral parts of new sprays or as attachments quickly applicable to any of the sprays now on the market.

What I claim is:

A freely rockable bath-spray faucet attachment comprising a hemispherical faucet-contact cup having a washer of resilient material peripherally fixed to the rim thereof, said washer having a conically apertured central portion forming a faucet seat and yieldingly depending into the hollow of the cup; an apertured clamping plate rockably seated upon the curved wall of said cup; and faucet engaging clamping hooks having clamping nuts adjustably seated in said plate.

In testimony whereof I affix my signature.

HENRY F. LOOMIS.